United States Patent
Tatsumi et al.

(10) Patent No.: US 7,762,568 B2
(45) Date of Patent: Jul. 27, 2010

(54) STIFFENING DEVICE

(75) Inventors: Hideharu Tatsumi, Tokyo (JP); Mitsuo Kimura, Tokyo (JP); Yoshimitsu Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 12/219,055

(22) Filed: Jul. 15, 2008

(65) Prior Publication Data

US 2009/0020972 A1 Jan. 22, 2009

(30) Foreign Application Priority Data

Jul. 20, 2007 (JP) .......................... P2007-189312

(51) Int. Cl.
*B60G 3/18* (2006.01)
(52) U.S. Cl. .................. 280/124.137; 280/124.145; 280/124.149
(58) Field of Classification Search ............ 280/5.502, 280/5.506, 5.507, 5.511, 5.512, 6.154, 124.106, 280/124.134, 124.137, 124.145, 124.146, 280/124.147, 124.149, 124.151, 124.152, 280/124.155
See application file for complete search history.

(56) References Cited

U.S. PATENT DOCUMENTS

| | | | | | |
|---|---|---|---|---|---|
| 4,484,767 A | * | 11/1984 | Klem | ................... | 280/124.107 |
| 4,546,997 A | * | 10/1985 | Smyers | ..................... | 280/5.509 |
| 4,550,926 A | * | 11/1985 | MacIsaac | ................. | 280/5.509 |
| 5,324,056 A | * | 6/1994 | Orton | ................... | 280/124.106 |
| 5,839,741 A | * | 11/1998 | Heyring | ............... | 280/124.106 |
| 6,722,676 B2 | * | 4/2004 | Zadok | ................... | 280/124.106 |
| 6,793,228 B2 | * | 9/2004 | Zadok | ................... | 280/124.134 |
| 7,467,802 B2 | * | 12/2008 | Peng et al. | ............. | 280/124.103 |
| 2003/0116935 A1 | * | 6/2003 | Zadok | ................... | 280/124.106 |
| 2003/0122336 A1 | * | 7/2003 | Zadok | ................... | 280/124.106 |
| 2006/0027993 A1 | | 2/2006 | Takayanagi et al. | | |

FOREIGN PATENT DOCUMENTS

| | | |
|---|---|---|
| EP | 1 209 062 A2 | 5/2002 |
| JP | 2002-308149 | 10/2002 |
| JP | 2005-162112 A | 6/2005 |
| JP | 2006-182133 | 7/2006 |
| JP | 2006-182133 A | 7/2006 |
| JP | 2006-182137 A | 7/2006 |

OTHER PUBLICATIONS

European Search Report dated Oct. 20, 2009.
Japanese Office Action dated Sep. 11, 2009 with English-language translation.

* cited by examiner

*Primary Examiner*—Toan C To
(74) *Attorney, Agent, or Firm*—McGinn IP Law Group, PLLC

(57) ABSTRACT

The stiffening device of the present invention is provided between left and right shock absorber support portions formed in a vehicle body, and includes a left side shaft and a right side shaft fixed to the left and right shock absorber support portions, respectively, and a rotation allowing portion that connects the left side shaft and right side shaft in a vehicle width direction central portion of the vehicle body, and allows the left side shaft and right side shaft to rotate. Fixing locations in which the left side shaft and right side shaft are fixed to the shock absorber support portions are disposed further toward a vehicle front side than the position of a rod axis of the shock absorber in the vicinity of the shock absorber support portion.

20 Claims, 13 Drawing Sheets

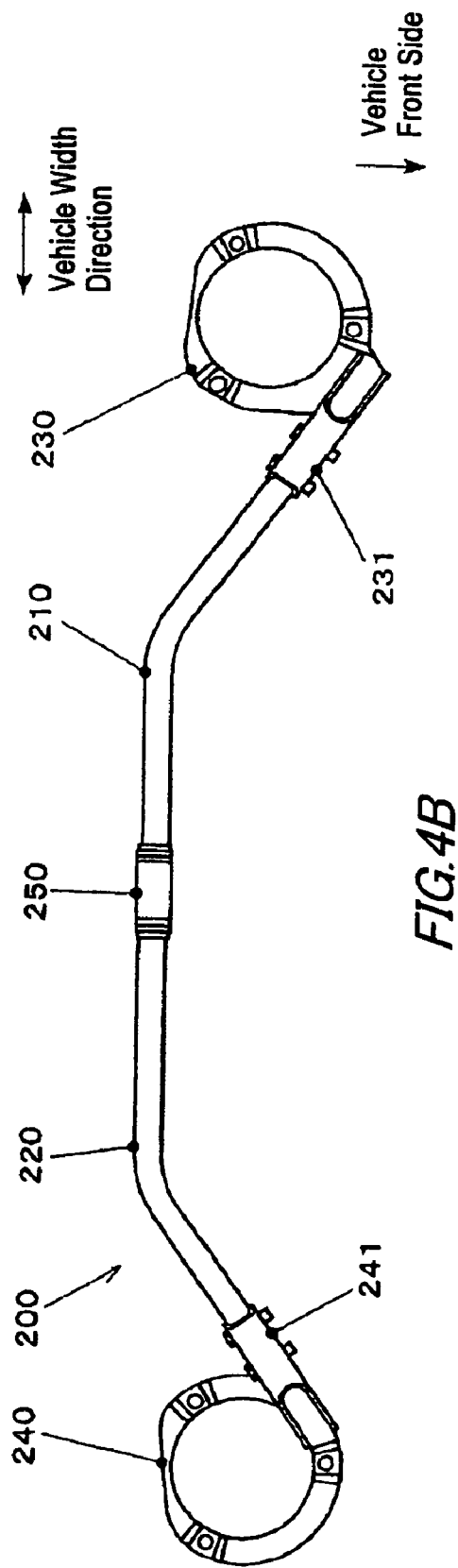
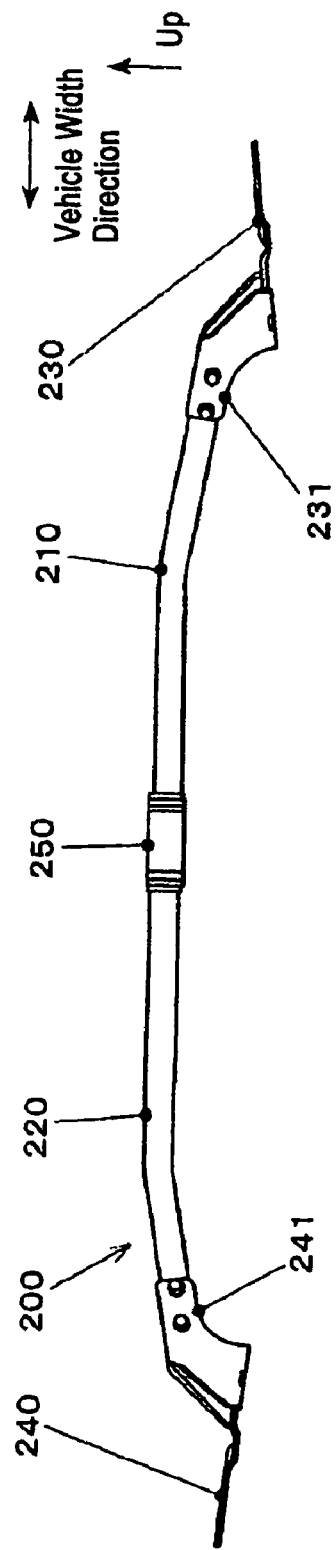
FIG.4A
FIG.4B

Diagram of Tower Bar Bending Moment

Turning Inner Wheel Cornering Force

Turning Outer Wheel Cornering Force

Inner Wheel Side End Portion

Outer Wheel Side End Portion

Diagram of Tower Bar Bending Moment

Turning Inner Wheel Cornering Force

Turning Outer Wheel Cornering Force

| Inner Wheel Side End Portion | | Outer Wheel Side End Portion |

Diagram of Tower Bar Bending Moment

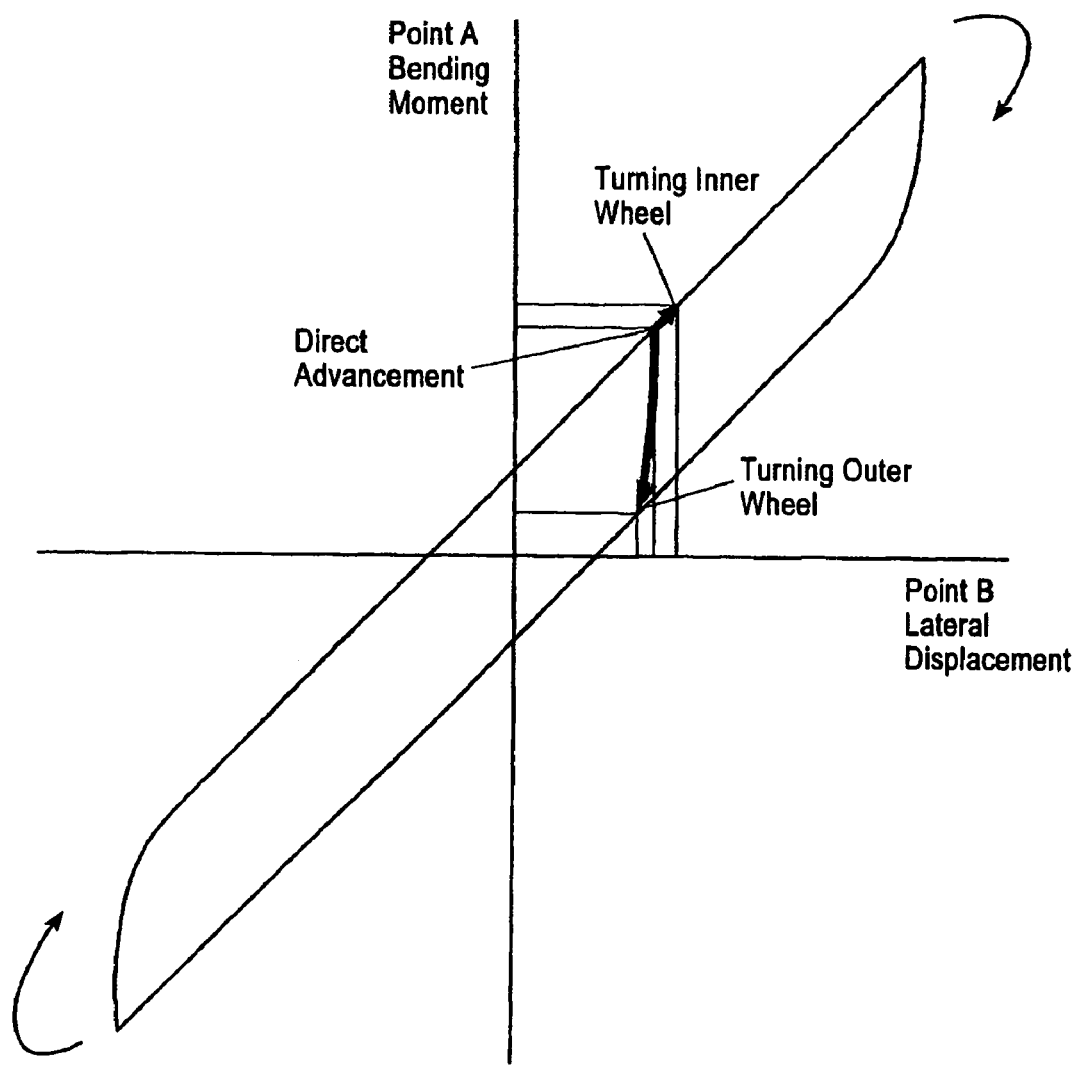

STIFFENING DEVICE

CROSS-REFERENCE TO RELATED APPLICATIONS

The disclosure of Japanese Patent Application No. 2007-189312, filed on Jul. 20, 2007 including the specification, drawings and abstract is incorporated herein by reference in its entirety.

BACKGROUND OF THE INVENTION

1. Field of the Invention

The present invention relates to a stiffening device (a flexible tower bar) used with a vehicle, more particularly, used with a vehicle having left and right shock absorbers to stiffen (improve the rigidity of) a vehicle body.

2. Description of the Related Art

Providing a beam-shaped stiffening device between vehicle body side attachment portions of left and right suspensions in the vehicle body of a vehicle such as an automobile is known in the related art. Among such stiffening devices, a device that is provided between left and right strut support portions of a strut-type suspension is known as a strut tower bar, and is widely used due to the ease with which it can be attached latterly to a pre-existing vehicle body and its effect of improving steering stability.

Providing a rotation allowing portion such as a pillow ball joint on an intermediate part of such a strut tower bar is also known in the related art (see Japanese Patent Application Laid-open No. 2006-182133, for example).

When a vehicle turns, a suspension arm on a turning inner wheel side tends to be drawn out toward a turning center side by the flexure of a vehicle body, including a sub-frame and so on, which is caused by a cornering force generated by a tire. In the case of a vehicle (a forward-projecting knuckle arm vehicle) in which a steering tie rod for steering a front wheel is disposed further forward than a kingpin axis serving as the steering axis of the front wheel, when the suspension arm on the turning inner wheel side is drawn out, a reduction (return) in the actual steering angle occurs, leading to a reduction in the slip angle of the tire and a reduction in the cornering force. Thus, the cornering force generated by a turning outer wheel increases relative to the turning inner wheel, thereby suppressing a jack-down phenomenon of the turning inner wheel side suspension and promoting a jack-up phenomenon of the turning outer wheel side suspension. As a result, rolling accompanying front rising pitching behavior occurs on the vehicle. When a vehicle turns, front falling pitching behavior is usually preferable in terms of steering stability and driver feeling, and therefore displacement of the suspension arm at the turning inner wheel side is preferably reduced to a minimum.

It is known that when the strut tower bar described above is attached, on the other hand, flexure of the vehicle body is suppressed, and therefore displacement of the suspension arm at the turning inner wheel side at an initial steering stage is suppressed. However, to achieve further improvements in driver feeling during a turn and steering stability in the initial steering stage, it is necessary to reduce displacement of the suspension arm at the turning inner wheel side even further to prevent return of the actual steering angle of the turning inner wheel.

SUMMARY OF THE INVENTION

In consideration of the problems described above, an object of the present invention is to provide a stiffening device with which a further improvement in the steering stability of a vehicle is achieved.

The present invention is capable of solving the problems described above by the following means.

According to a first aspect of the present invention, there is provided a stiffening device provided between left and right shock absorber support portions which are formed in a part of a vehicle body and on which shock absorber upper end portions of left and right suspension devices are respectively supported, and includes: a left side shaft and a right side shaft fixed to the left and right shock absorber support portions, respectively; and a rotation allowing portion that connects the left side shaft and the right side shaft in a central portion of the vehicle body in a vehicle width direction, and allows the left side shaft and the right side shaft to rotate. A fixing location in which the left side shaft and the right side shaft are fixed to the shock absorber support portions is disposed further toward a vehicle front side than a position of a rod axis of the shock absorber in the vicinity of the shock absorber support portion.

According to of a first preferred embodiment of the first aspect of the present invention, the rotation allowing portion may be offset toward a vehicle rear side or the vehicle front side in relation to the fixing location in which the left side shaft and the right side shaft are fixed to the shock absorber support portions.

According to a second aspect of the present invention, there is provided a stiffening device for a vehicle having left and right shock absorbers including a first ring-shaped plate, a second ring-shaped plate, a first shaft, and a second shaft. The first ring-shaped plate is fixed to a vehicle body in the proximity to an upper end portion of one of the left and right shock absorbers. The second ring-shaped plate is fixed to the vehicle body in the proximity to an upper end portion of the other of the left and right shock absorbers. The first shaft has one end connected to the first ring-shaped plate on one side of an axis connecting a center of the first ring-shaped plate and a center of the second ring-shaped plate. The second shaft has one end connected to the second ring-shaped plate on one side of the axis. The other end of the first shaft and the other end of the second shaft are configured to rotatably connect each other.

According to a first preferred embodiment of the second aspect of the present invention, the first shaft may be configured to extend across the axis to position the other end of the first shaft on the other side of the axis, and the second shaft is configured to extend across the axis to position the other end of the second shaft on the other side of the axis.

Typically, when an arm at a turning inner wheel side is drawn out by the cornering force of a tire during a vehicle turn, vehicle body front side structures such as the vehicle frame receive axial torsion substantially in alignment with the front-rear direction of the vehicle, and as a result, a shock absorber support portion provided on an upper portion of a suspension device displaces toward a vehicle width direction inner side. At this time, the frame and so on are fixed to a cabin front portion partition wall, and therefore the displacement amount increases toward the vehicle front side.

When the shock absorber support portion on the turning inner wheel side displaces toward the vehicle width direction inner side, bending deformation occurs in the shaft of the stiffening device, and as a result, a bending moment is generated. This bending moment is transmitted to the shock absorber support portions as a reaction force, and acts to suppress deformation of the vehicle body on the turning inner wheel side.

According to the first aspect of the present invention, the rotation allowing portion is provided between the left side shaft and the right side shaft of the stiffening member, and therefore the bending moments of the left and right side shafts can be reduced to zero by the rotation allowing portion. Moreover, a large bending moment can be generated in the fixing locations between the left and right shafts and the shock absorber support portions in comparison with a stiffening device not having such a rotation allowing portion. These bending moments have opposite orientations and identical magnitudes on the turning inner wheel side and the turning outer wheel side. Hence, the bending moment that is generated as a result of vehicle body deformation on the turning inner wheel side can be transmitted effectively to both the turning inner wheel side and the turning outer wheel side. The bending moment that is transmitted to the vehicle body side suppresses vehicle body deformation on the turning inner wheel side in the manner described above, while on the turning outer wheel side, the bending moment acts in a direction for displacing a lower arm toward the vehicle width direction inner side by twisting the vehicle body in an opposite direction to the inner wheel side.

By disposing the fixing location, in which the bending moment is input from each shaft to the vehicle body side, on the vehicle front side of the rod axis of the shock absorber, deformation of the vehicle body on the turning inner wheel side can be suppressed more effectively than a case in which the fixing location is disposed on the vehicle rear side where the deformation amount of the vehicle body is comparatively small, and deformation of the vehicle body on the turning outer wheel side can also be promoted.

Further, by offsetting the position of the rotation allowing portion to the vehicle rear side or front side of the fixing location, the distance between the fixing location and the rotation allowing portion (the span of each shaft) can be increased in comparison with a case in which the left and right fixing locations and the rotation allowing portion are disposed on a straight line in the vehicle width direction, and therefore the bending moment generated in each shaft can be increased even further.

Moreover, interference with other components disposed in the engine room, such as intake system components, can be prevented.

According to the second aspect of the present invention, the other end of the first shaft and the other end of the second shaft being configured to rotatably connect each other, and therefore, in a case where the stiffening device is attached to the vehicle body, the bending moments of the first shaft and the second shaft can be reduced to zero by the allowable rotation. Moreover, a large bending moment can be generated in the fixing locations, at which the first ring-shaped plate and the second ring-shaped plate are respectively fixed to the vehicle body, in comparison with a stiffening device not having such an allowable rotation. These bending moments have opposite orientations and identical magnitudes on the turning inner wheel side and the turning outer wheel side. Hence, the bending moment that is generated as a result of vehicle body deformation on the turning inner wheel side can be transmitted effectively to both the turning inner wheel side and the turning outer wheel side. The bending moment that is transmitted to the vehicle body side suppresses vehicle body deformation on the turning inner wheel side in the manner described above, while on the turning outer wheel side, the bending moment acts in a direction for displacing a lower arm toward the vehicle width direction inner side by twisting the vehicle body in an opposite direction to the inner wheel side.

Further, one end of each shaft is connected to each plate on one side of an axis connecting a center of the first ring-shaped plate and a center of the second ring-shaped plate so that the fixing location, in which the bending moment is input from each shaft to the vehicle body side, is capable of being disposed on the vehicle front of the rod axis of the shock absorber, thus deformation of the vehicle body on the turning inner wheel side can be suppressed more effectively than a case in which the fixing location is disposed on the vehicle rear side where the deformation amount of the vehicle body is comparatively small, and deformation of the vehicle body on the turning outer wheel side can also be promoted.

Further, each shaft extends across the axis to position the other end of each shaft on the other side of the axis so that the distance between the one end and the other end (the span of each shaft) can be increased in comparison with a case in which the other end is not positioned on the other side of the axis, and therefore the bending moment generated in each shaft can be increased even further.

Moreover, interference with other components disposed in the engine room, such as intake system components, can be prevented.

According to these actions, the present invention can suppress deformation of the vehicle body, thereby reducing lateral displacement of the turning inner wheel side suspension arm, preventing return of the actual steering angle of the turning inner wheel, and suppressing cornering force reductions. Meanwhile, the vehicle body on the turning outer wheel side can be deformed in an opposite direction to the turning inner wheel side such that the lower arm can be displaced toward the vehicle width direction inner side, the actual steering angle of the turning outer wheel can be reduced, and the cornering force generated by the turning outer wheel can be reduced. As a result, the jack-down phenomenon of the turning inner wheel side suspension can be promoted, the jack-up phenomenon of the turning outer wheel side suspension can be suppressed, and rolling behavior accompanying front falling pitching behavior can be obtained in the vehicle body, providing the driver with a favorable feeling.

Further, by increasing the cornering force of the turning inner wheel, yaw buildup in the initial stage of the turn can be achieved more quickly, enabling an improvement in steering stability.

BRIEF DESCRIPTION OF THE DRAWINGS

FIGS. 4A and 4B are two-surface views showing the exterior of the strut tower bar according to the embodiment, in which FIG. 4A is an upper view of the strut tower bar attached to the vehicle, and FIG. 4B is a front view of the strut tower bar;

FIGS. 6A and 6B are pattern diagrams illustrating a constitution of a suspension device and vehicle body deformation during a turn according to a first comparative example, in which FIG. 6A is a view seen from the front side of the vehicle, and FIG. 6B shows the upper side frame and the strut housing portion from an upper side;

FIGS. 8A to 8C is pattern diagrams illustrating the constitution of a strut tower bar and a suspension device according to a second comparative example and vehicle body deformation during a turn, in which FIG. 8A is a view seen from the front side of the vehicle, FIG. 8B shows the upper side frame and the strut housing portion from an upper side, and FIG. 8C is a diagram showing a bending moment of the strut tower bar;

FIGS. 10A to 10C are pattern diagrams illustrating the constitution of a strut tower bar and a suspension device according to a third comparative example and vehicle body deformation during a turn, in which FIG. 10A is a view seen from the front side of the vehicle, FIG. 10B shows the upper side frame and the strut housing portion from an upper side, and FIG. 10C is a diagram showing a bending moment of the strut tower bar;

FIGS. 12A to 12C are pattern diagrams illustrating vehicle body deformation during a turn according to the embodiment, in which FIG. 12A is a view seen from the front side of the vehicle, FIG. 12B shows the upper side frame and the strut housing portion from an upper side, and FIG. 12C is a diagram showing a bending moment of the strut tower bar; and FIG. 13 is a graph showing a correlation between a bending moment of a front cross member support portion and lateral displacement of a bracket during a turn according to the embodiment.

DESCRIPTION OF THE PREFERRED EMBODIMENTS

Embodiment

An embodiment of a strut tower bar serving as a stiffening device to which the present invention is applied will now be described.

The strut tower bar of this embodiment is provided between left and right strut upper mounts of a MacPherson strut-type front suspension for an automobile such as a passenger vehicle.

Figure 1:
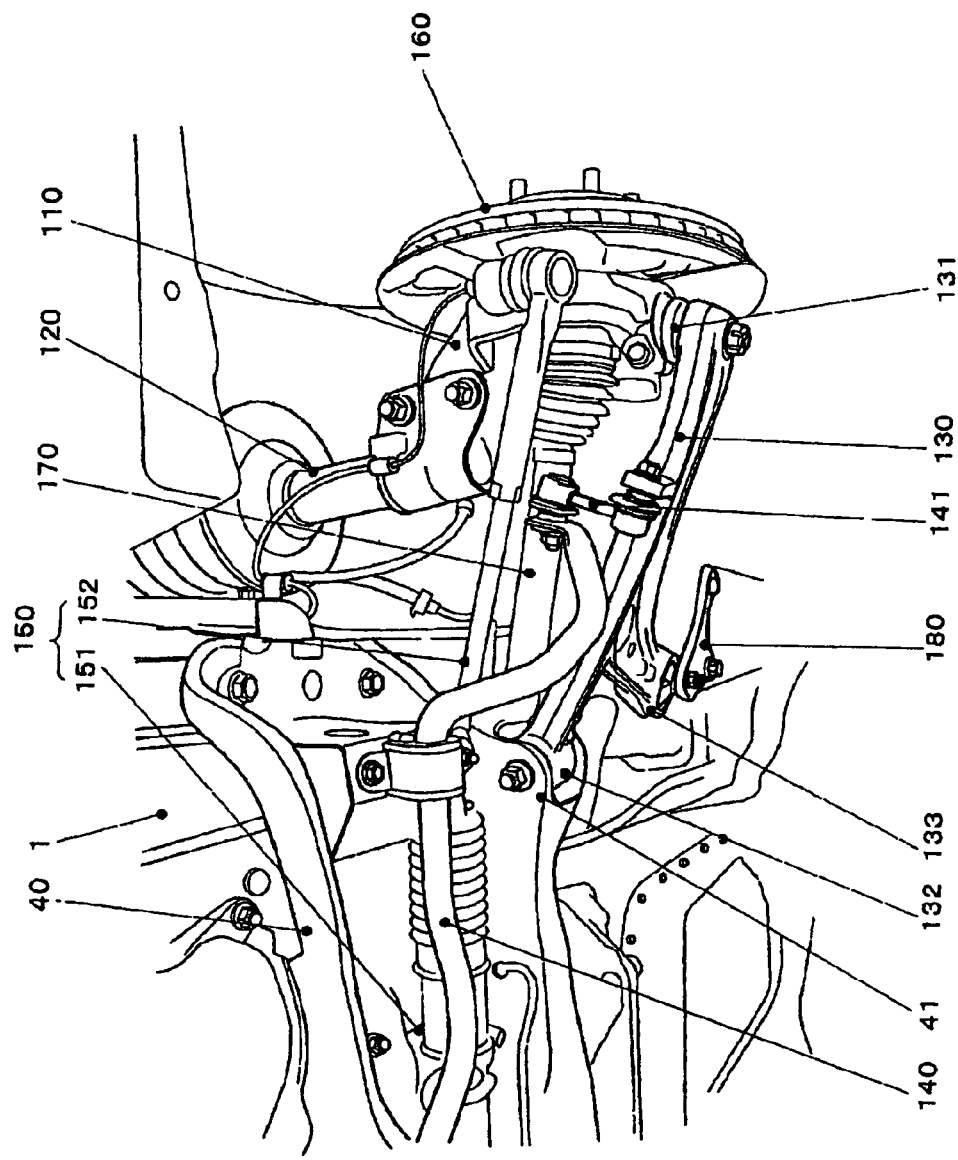
FIG. 1 is an external perspective view showing a suspension device for a vehicle attached with a strut tower bar, which serves as an embodiment of a stiffening device to which the present invention is applied, from the front side of a vehicle body floor lower side.

FIG. 1 is an external perspective view showing a suspension device for a vehicle attached with the strut tower bar of this embodiment from the front side of a vehicle body floor lower side.

Figure 2:
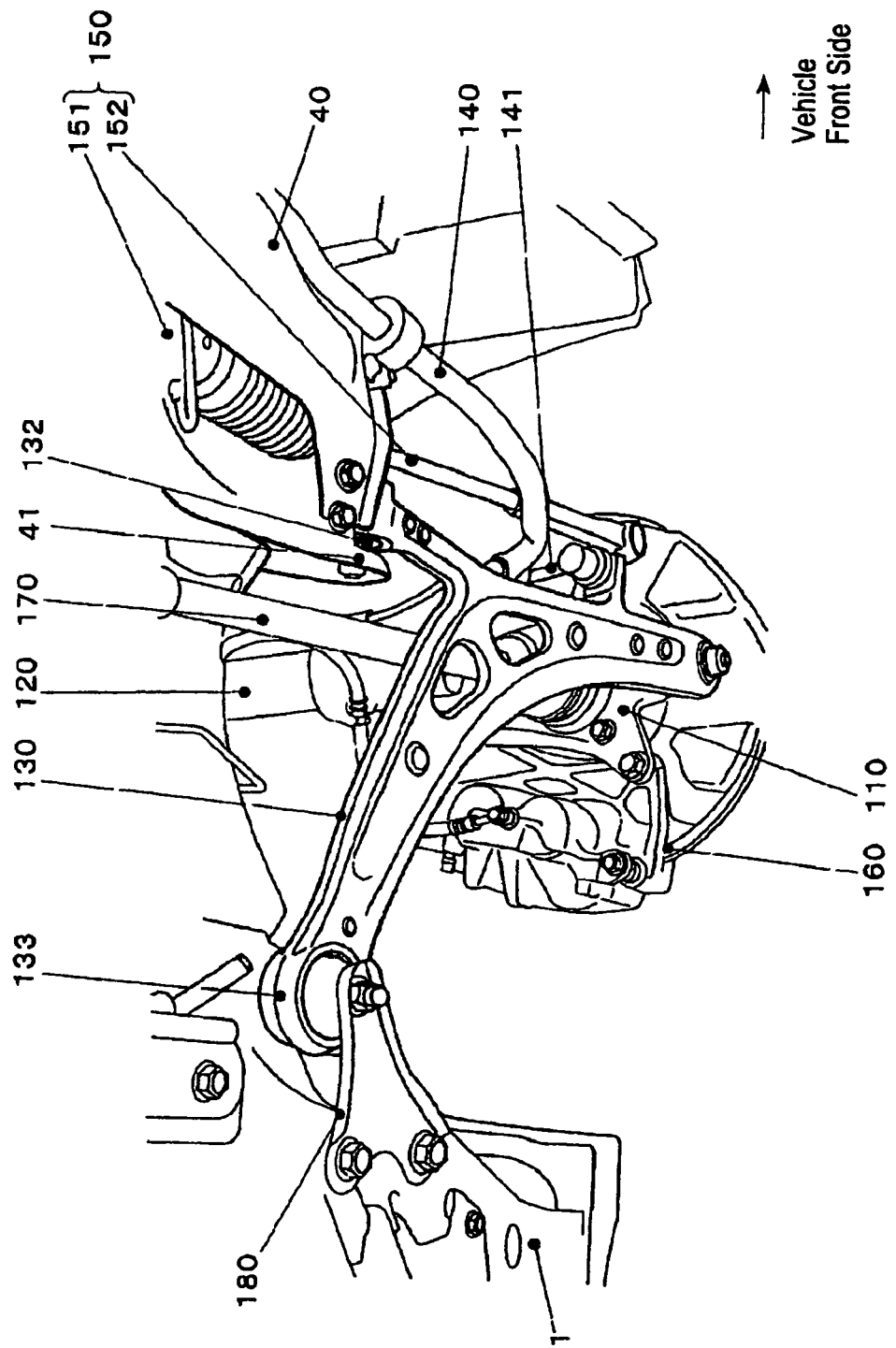
FIG. 2 is an external perspective view showing the suspension device of FIG. 1 from a vehicle width direction central portion side of the vehicle body floor lower side.

FIG. 2 is an external perspective view showing the suspension device of FIG. 1 from a vehicle width direction central portion side of the vehicle body floor lower side.

Figure 3:
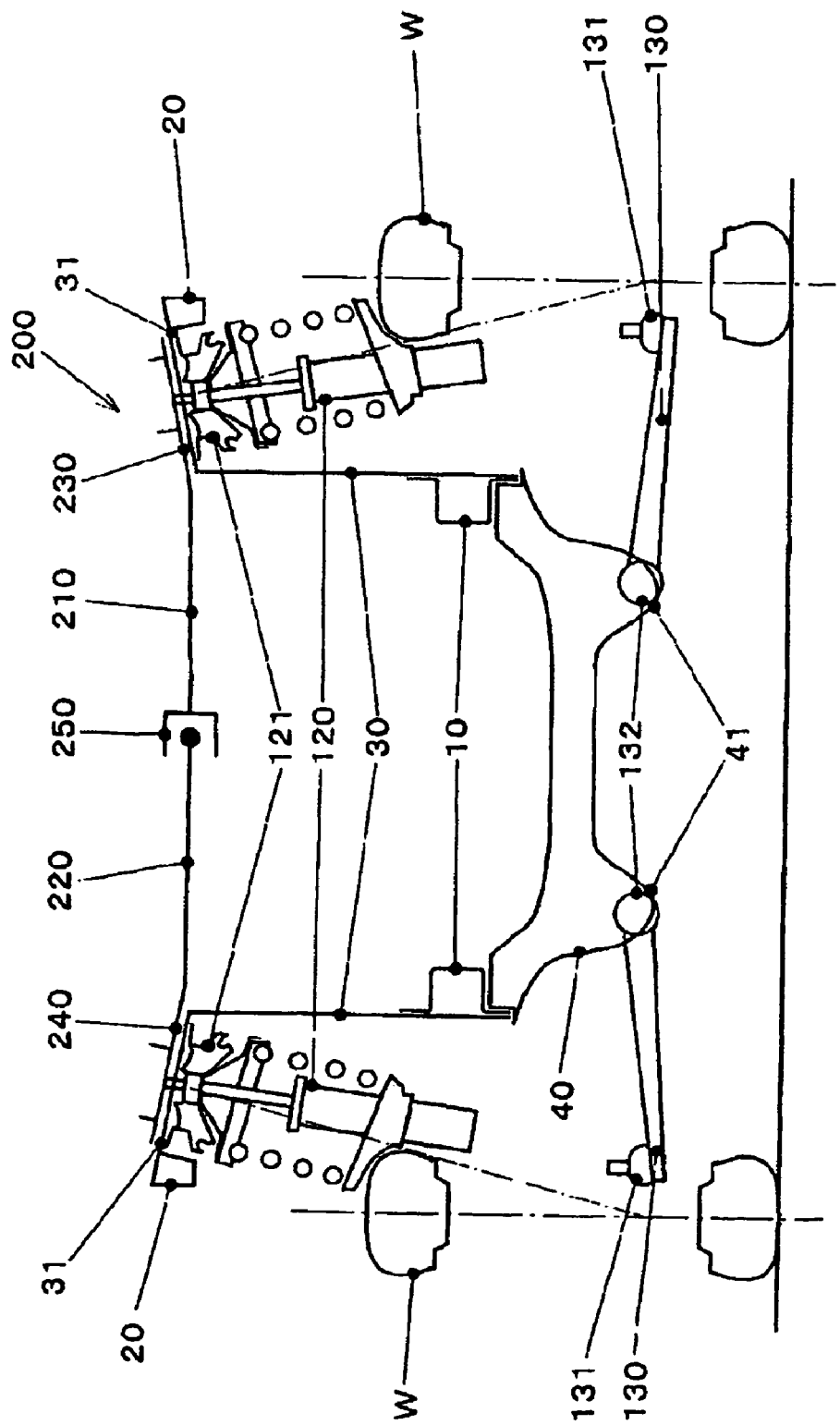
FIG. 3 is a pattern diagram showing the constitution of the strut tower bar and the suspension device according to the embodiment.

FIG. 3 is a pattern diagram showing the constitution of the strut tower bar and the suspension device according to this embodiment, seen from a vehicle front side.

As shown in FIG. 3 and so on, a vehicle body 1 of a vehicle is constituted by a lower side frame 10, an upper side frame 20, a strut housing portion 30, and a front cross member 40.

The vehicle body 1 is a steel monocoque body, for example, having an independent engine room on the front of a cabin (vehicle cabin), not shown in the drawings. A front suspension is disposed on the two side portions of the engine room.

The lower side frame 10 is a beam-shaped structural member that is disposed substantially in alignment with a front-rear direction of the vehicle so as to project toward the front side of the vehicle from a toe board, not shown in the drawings, serving as a front portion partition wall of the cabin. The lower side frame 10 is provided in a pair, the pair of lower side frames 10 being separated in a vehicle width direction, and a power train including an engine and so on is housed between the lower side frames 10.

The upper side frame 20 is a beam-shaped structural member that is disposed substantially in alignment with the front-rear direction of the vehicle so as to project toward the front side of the vehicle from a bulkhead provided on the upper side of the toe board. The upper side frame 20 is provided in a pair, the pair of upper side frames 20 being separated in the vehicle width direction and disposed further toward the upper side and the vehicle width direction outer side than the lower side frames 10. The upper side frames 20 extend along an upper end portion of a front fender, not shown in the drawings, of the vehicle.

The strut housing portion 30 is a part for housing a strut 120, to be described below. The strut housing portion 30 is formed in a cup shape open to the lower side, for example, and an upper end portion (the bottom portion of the cup shape) thereof is formed with a strut support portion 31 to which a strut upper mount 121 of the strut 120 is fixed. The strut support portion 31 corresponds to a shock absorber support portion of the present invention.

As shown in FIG. 3, a lower end portion of the strut housing portion 30 is connected fixedly to a vehicle width direction outer side end portion of an upper surface portion of the lower side frame 10. Further, the upper end portion (the part near the strut support portion 31) of the strut housing portion 30 is connected fixedly to a vehicle width direction inner side end portion of an upper surface portion of the upper side frame 20.

Note that the lower side frame 10, upper side frame 20 and strut housing portion 30 described above constitute a part of a white body of the vehicle body 1, and are joined to each other by spot welding or the like, for example.

The front cross member 40 is a beam-shaped member that is attached to a lower portion of the vehicle body 1 so as to extend in the vehicle width direction, and serves as a base portion on which various members constituting the suspension device are mounted.

As shown in FIG. 3, upper surface portions of the respective end portions of the front cross member 40 in the vehicle width direction are fixed to the respective lower surface portions of the lower side frames 10 of the vehicle body by means of a bolt/nut fastening or the like, for example.

Further, a bracket 41 is formed on the front cross member 40 so as to project from the lower portion thereof. The bracket 41 serves as a vehicle body side fulcrum of a lower arm 130, and is provided in a pair, the pair of brackets 41 being separated in the vehicle width direction so as to correspond to left and right lower arms 130.

Further, a power train including an engine and so on, not shown in the drawings, is installed in an upper portion of the front cross member 40 via an engine mount having an elastic body or the like.

The suspension device is constituted by a housing 110, the strut 120, the lower arm 130, a stabilizer 140, and so on. The suspension device is also provided with a steering system 150, a front brake 160, a drive shaft 170, and a support plate 180.

A strut tower bar 200 is attached between upper end portions of left and right struts 120.

The housing (knuckle) 110 is a member made of cast steel, for example, for housing a hub bearing that rotatably supports a front wheel hub, not shown in the drawings, to which a vehicle wheel W is attached.

The housing 110 includes a knuckle arm which is formed so as to project further toward the front side than the housing 110 and to which a tie rod 52 of the steering system 50, to be described below, is connected.

The strut 120 is an assembly constituted by a coil spring and a shock absorber, and includes the strut upper mount 121 on the upper end portion thereof. The strut upper mount 121 is fixed to the strut support portion 31 of the strut housing portion 30 of the vehicle body 1. Meanwhile, a lower end portion of the strut 120 is fixed to an upper end portion of the housing 110.

The strut 120 rotates about a steering axis (kingpin) together with the housing 110 when the front wheel turns, and also expands and contracts in accordance with the stroke of the suspension device. Here, the kingpin forms a straight line linking the position of a piston rod axis of the shock absorber on the upper end portion of the strut 120 and a rotary center of a ball joint 131, on which the housing 110 is supported, relative to the lower arm 130.

The strut upper mount 121 includes a rubber vibration isolator for reducing vibration and the like that is transmitted to the vehicle body 1 side from the strut 120, a bearing that supports a main body of the strut 120 to be capable of rotating relative to the vehicle body 1 about the kingpin, and so on. The bearing is disposed substantially concentrically with the rod axis of the shock absorber of the strut 120.

The strut upper mount 121 includes an upwardly projecting bolt, and the strut 120 is fixed to the vehicle body 1 by inserting the bolt into a bolt hole formed in the strut support portion 31 on the vehicle body 1 side and fastening the bolt using a nut.

The lower arm 130 is a suspension arm disposed between the housing 110 and the bracket 41 of the front cross member 40 and vehicle body 1, and is formed by forging an aluminum alloy or pressing steel, for example.

On the vehicle body side, the lower arm 130 is connected to the bracket 41 and so on in two connection portions disposed at a remove from each other in the front-rear direction of the vehicle, and vibrates (rotates) about a vibration central axis, which is a straight line linking the two connection portions, in accordance with the stroke of the suspension device. A front side connection portion of the lower arm 130 is connected to the bracket 41 of the front cross member 40, while a rear side connection portion is connected to the vehicle body 1 bypassing the front cross member 40.

Further, the lower arm 130 is connected to the lower end portion of the housing 110 via the ball joint 131 such that the housing 110 is capable of vibrating and rotating relative to the lower arm 130 about a center point of a ball, not shown in the drawings, of the ball joint 131.

The lower arm 130 is bent substantially into an L shape, and rubber bushes are provided respectively on the front and rear connection portions to the vehicle body and so on.

The lower arms 130 are provided respectively with cylindrical portions 132, 133 into which respective outer tubes of the front and rear rubber bushes are press-fitted. The front side cylindrical portion 132 is disposed such that an axial direction thereof substantially matches the front-rear direction of the vehicle. The front side rubber bush is fixed to the bracket 41 of the front cross member 40 by a bolt inserted into an inner tube thereof. The rear side cylindrical portion 133 is disposed such that an axial direction thereof substantially matches a vertical direction. The rear side rubber bush is fixed to the vehicle body 1 and the support plate 180 by a bolt inserted into an inner tube thereof.

The stabilizer (anti-roll bar) 140 is formed by bending spring steel wire, for example, has an intermediate part that extends in the vehicle width direction, and is connected to respective front edge portions of the left and right lower arms 130 via a link 141. When the left and right front suspensions displace relative to each other in a negative phase direction, for example when the vehicle rolls or the like, the intermediate part of the stabilizer 140 is twisted such that a spring reaction force is generated, and thus the stabilizer 140 generates a force for reversing the roll.

The steering system 150 steers the front wheel in accordance with an operation of a steering wheel, not shown in the drawings, and includes a steering gearbox 151 and the tie rod 152.

The steering gearbox 151 includes a rack and pinion mechanism for converting the rotary motion of a steering shaft, not shown in the drawing, connected to the steering wheel into a rectilinear motion in the vehicle width direction.

The tie rod 152 is a rod-shaped member that connects the steering gearbox 151 to the knuckle arm provided on the front end portion of the housing 110 and transmits the movement of a steering rack, not shown in the drawings, to the housing 110 in order to steer the housing 110. The tie rod 152 is connected to the knuckle arm of the housing 110 via a ball joint provided on a tie rod end, which is an end portion on the vehicle width direction outer side thereof.

The front brake 160 is a ventilated disc brake having a rotor that rotates together with the vehicle wheel and a caliper that grips the rotor between brake pads, for example.

The drive shaft 170 is a driving force transmission shaft for transmitting driving force to the wheel hub (not shown) attached to the housing 110 from a differential gear not shown in the drawings. A constant velocity joint is provided on the two end portions of the drive shaft 170 to make the drive shaft 170 bendable.

The support plate 180 is a member for supporting a lower portion of the rear side rubber bush, which is formed from plate metal, for example, and fixed to a floor portion of the vehicle body 1 by a bolt or the like.

As shown in FIG. 3, the strut tower bar 200 is a stiffening device provided between the left and right strut support portions 31 of the vehicle body 1, and is constituted by a flexible strut tower bar having a rotation allowing portion in an intermediate portion thereof.

FIGS. 4A and 4B are two-surface views showing the exterior of the strut tower bar, FIG. 4A showing the strut tower bar from above when attached to the vehicle, and FIG. 4B showing the strut tower bar from the front of the vehicle.

The strut tower bar 200 is constituted by a left side shaft (a first shaft) 210, a right side shaft (a second shaft) 220, a left side plate (a first ring-shaped plate) 230, a right side plate (a second ring-shaped plate) 240, and a pillow ball joint 250.

The left side shaft 210 and right side shaft 220 are formed to extend from a central portion of the strut tower bar 200 in the vehicle width direction toward the left and right strut support portions 31, respectively. The left side shaft 210 and right side shaft 220 are formed by bending hollow metal pipes made of an aluminum alloy or the like, for example.

The left side shaft 210 and right side shaft 220 are each bent substantially in an intermediate portion thereof. When the strut tower bar 200 is attached to the vehicle body 1, the part of the left side shaft 210 and right side shaft 220 on the pillow ball joint 250 side (the vehicle body center side) of the bent portion is disposed substantially horizontally so as to extend substantially in the vehicle width direction. Further, the part of the left side shaft 210 and right side shaft 220 on the strut support portion 31 side of the bent portion is disposed at an incline such that the strut support portion 31 side is positioned further toward the vehicle front side and lower than the bent portion.

The left side plate 230 and right side plate 240 are parts for fixing the strut tower bar 200 to the left and right strut support portions 31 of the vehicle body 1. The left sideplate 230 and right side plate 240 are formed as ring-shaped plates using metal plates, for example, and are disposed substantially concentrically with the shock absorber rod axis of the strut 120. Three bolt holes are formed in each of the left side plate 230 and the right side plate 240 at substantially equal intervals in the circumferential direction thereof. The aforementioned bolt of the strut upper mount 121 is inserted into the bolt hole, and by means of a nut for fixing the strut 120, the left sideplate 230 and right side plate 240 are fastened (co-fastened) to the strut support portion 31.

The left side plate 230 and right side plate 240 are provided with brackets 231, 241 into which the left side shaft 210 and right side shaft 220 are respectively inserted fixedly. The brackets 231, 241 are formed by thin plate working, for example. The brackets 231, 241 are fixed to an upper surface of a vehicle front side part of the ring-shaped left side plate 230 and right side plate 240 by welding or the like. Here, the fixing locations for fixing the brackets 231, 241 to the left side shaft 210 and right side shaft 220 are disposed further toward the vehicle front side than the piston rod axis of the shock absorber of the strut 120. In other words, the left side shaft 210 and right side shaft 220 are connected to the ring-shaped left side plate 230 and right side plate 240 through the brackets 231, 241, so that the connection between each shaft 210, 220 and each plate 230, 240 is positioned on the offset location against an axis connecting a center of the plate 230 and a center of the plate 240.

The pillow ball joint 250 is a rotation allowing portion that connects the left side shaft 210 and right side shaft 220 and supports the left side shaft 210 and right side shaft 220 to be capable of rotating (vibrating) relative to each other. The pillow ball joint 250 includes a grease-sealed type spherical bearing having a ball fixed to one of the left side shaft 210 and right side shaft 220 and a race fixed to the other, and an outer peripheral surface thereof is covered by a dust boot formed in a tubular shape from a rubber-based material or the like, for example.

By bending the left side shaft 210 and right side shaft 220 as described above, the pillow ball joint 250 is disposed further toward the vehicle rear side than the fixing locations between the brackets 231, 241 and the left side shaft 210 and right side shaft 220 and also further toward the vehicle rear side than the shock absorber rod axis of the strut 120 when the strut tower bar 200 is attached to the vehicle body 1.

Figure 5:
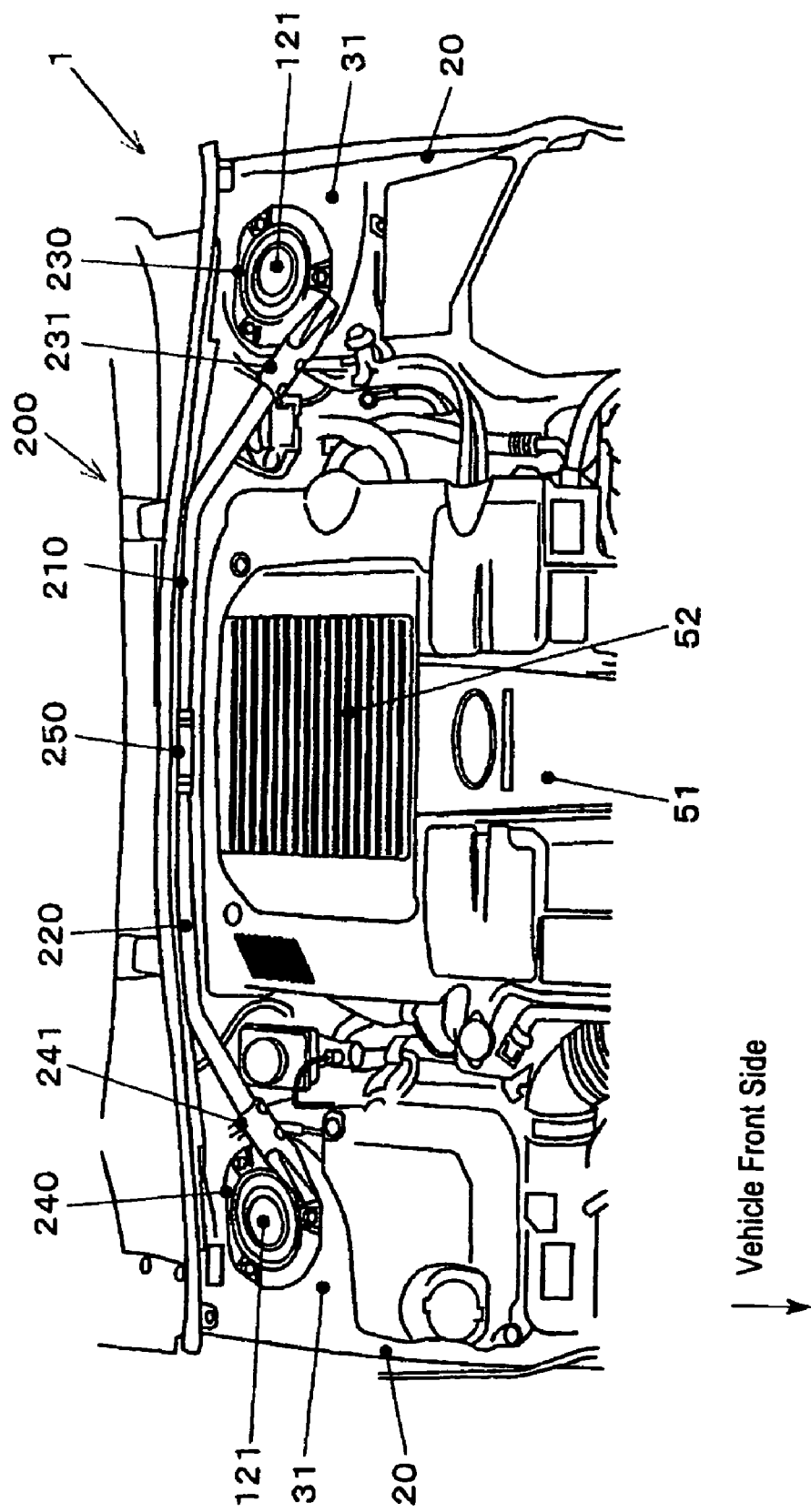
FIG. 5 is a perspective view showing the interior of an engine room of the vehicle according to the embodiment, in a state where the strut tower bar is attached.

FIG. 5 is a perspective view showing the interior of the engine room of the vehicle when the strut tower bar is attached.

The pillow ball joint 250 of the strut tower bar 200 is disposed to the rear of an intercooler 52, which is disposed to the rear of an engine cover 51 attached to an upper portion of the engine, not shown in the drawings, and housed between the intercooler 52 and the bulkhead. The intercooler 52 is an intake system component for cooling air that has been supercharged by a turbocharger, not shown in the drawings, through heat exchange with traveling wind to improve the charging efficiency of the engine.

Effects of the above embodiment will be described below through comparison with first through third comparative examples of the present invention. Note that in each of the comparative examples to be described below, substantially identical locations to those of the vehicle according to the above embodiment have been allocated identical reference numerals, and description thereof has been omitted.

First Comparative Example

Figure 6B:
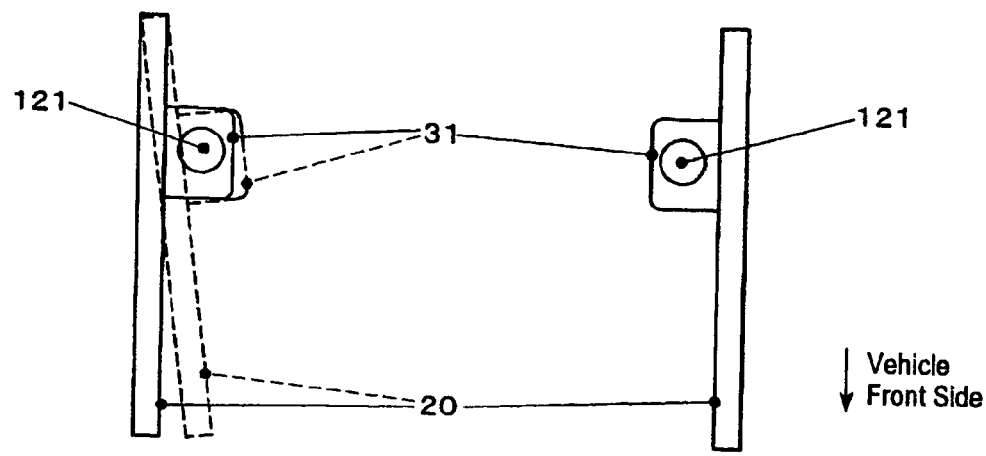
Figure 6A:
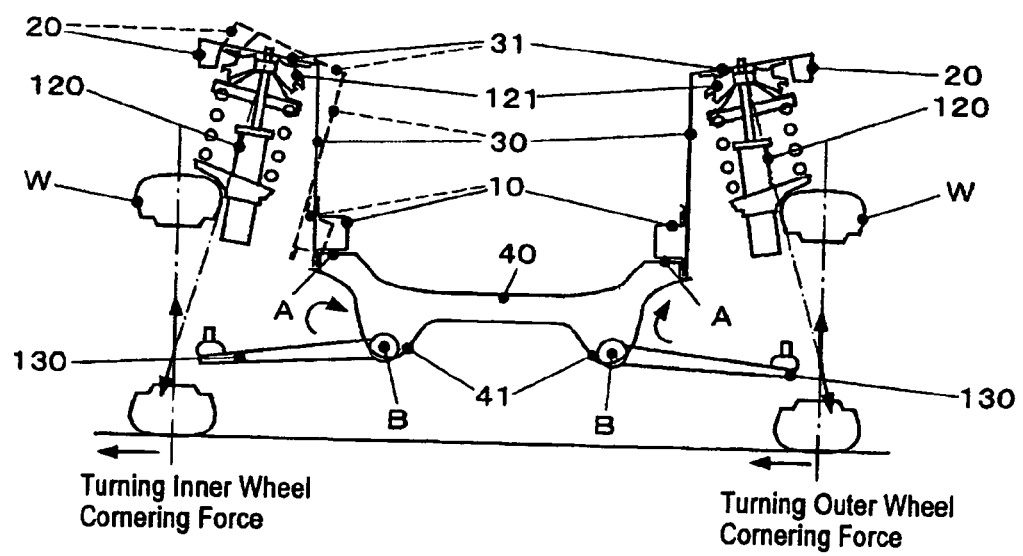

FIGS. 6A and 6B pattern diagrams showing a front suspension portion of a vehicle according to a first comparative example of the present invention. FIG. 6A is a view seen from the front side of the vehicle, and FIG. 6B shows the upper side frame and the strut housing portion from the upper side (likewise in FIGS. 8A and 8B, 10A and 10B, and 12A and 12B).

The first comparative example differs from the vehicle according to the embodiment described above in that the strut tower bar is not provided.

Typically, a tensile load acts on the lower arm 130 due to a ground contact load of the tire, even when the vehicle advances straight ahead or the like. As a result, a load in a direction for opening the left and right brackets 41 toward the vehicle width direction outer side is applied to the front cross member 40. This load acts on the front cross member 40 as a pre-load.

Further, the tensile force of the lower arm 130 generated by the ground contact load also causes a torsional moment to act on the lower side frame 10.

When the vehicle turns, a tensile load acting on the turning inner wheel side lower arm 130 toward the vehicle width direction outer side is increased by a cornering force (lateral force) generated by the tire toward a turning inner diameter side. In contrast, the tensile load acting on the turning outer wheel side lower arm 130 due to the ground contact load decreases, and when the cornering force increases further, the turning outer wheel side lower arm 130 receives a compression load so as to be pushed toward the vehicle width direction inner side.

Figure 7:
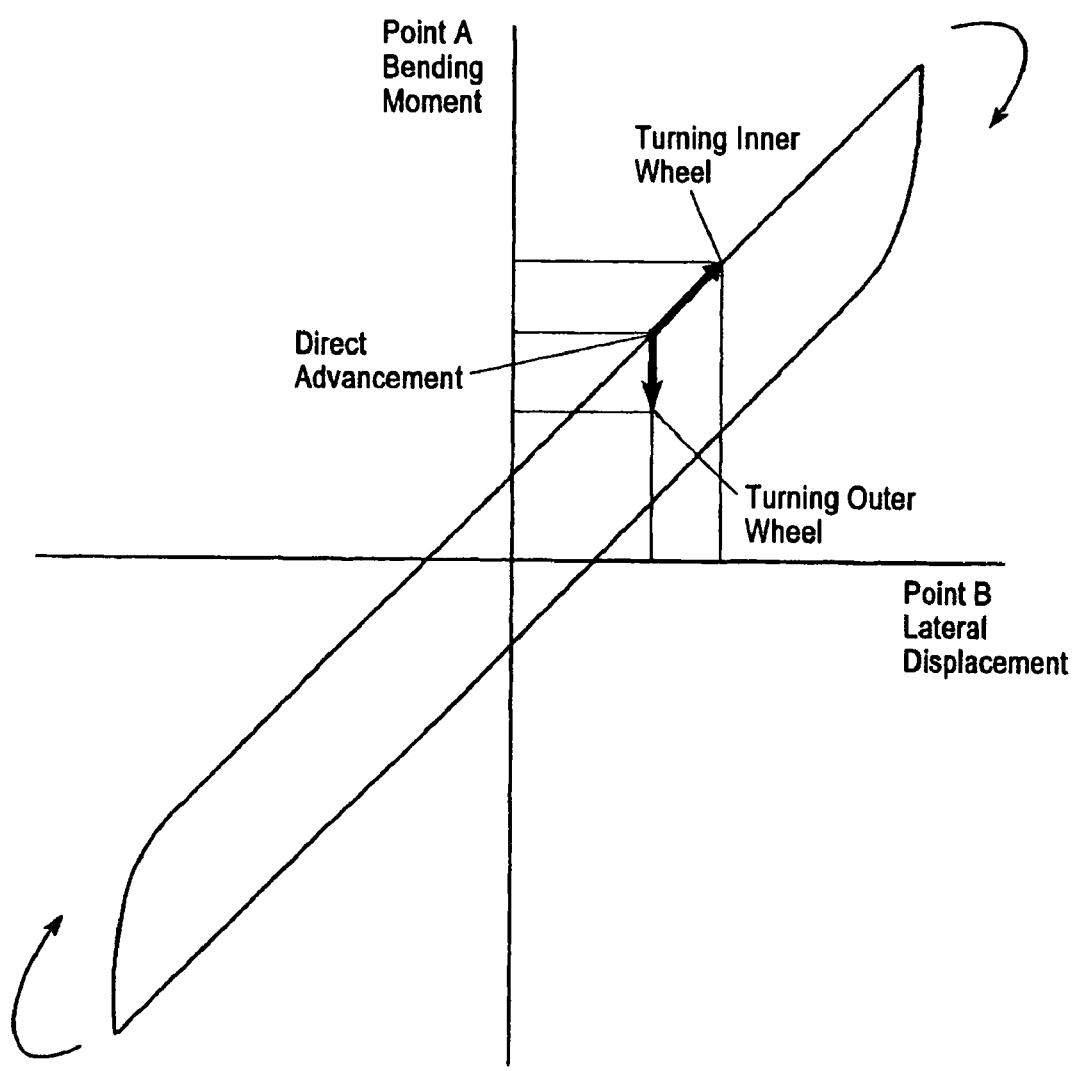
FIG. 7 is a graph showing a correlation between a bending moment of a front cross member support portion and lateral displacement of a bracket during a turn according to the first comparative example.

FIG. 7 is a graph showing a correlation between a bending moment of the front cross member support portion and lateral displacement of the bracket during a turn, according to the first comparative example. In FIG. 7, the ordinate shows a bending moment at a point A, which is a joint location between the front cross member 40 and the lower side frame 10, and the abscissa shows lateral displacement at a point B, which is a joint location between the bracket 41 of the front cross member 40 and the lower arm 130 (likewise in FIGS. 9, 11 and 13).

As shown in FIG. 7, the front cross member 40 has a hysteresis characteristic and receives a tensile load from the lower arm 130 even during direct advancement, as noted above. Therefore, turning increases the tensile load of the lower arm 130 on the turning inner wheel side such that when the bending moment at the point A begins to increase, displacement toward the vehicle width direction outer side begins immediately at the point B. Accompanying displacement at the point B, deformation occurs in the turning inner wheel side lower side frame 10, upper side frame 20, strut housing portion 30, and so on. More specifically, as shown by a broken line in FIG. 6, a torsional moment acts on the lower side frame 10 such that the lower side frame 10 is twisted, and as a result, the upper side frame 20 and strut housing portion 30 fixed to the upper side thereof displace toward the vehicle width direction inner side. At this time, the restraining strength of the lower side frame 10 and upper side frame 20 on the vehicle body rear side (the toe board and bulkhead side) is greater than the restraining strength on the front side, and therefore the lower side frame 10 and upper side frame 20 displace further toward the vehicle front side, as shown by a broken line in FIG. 6B. Thus, a cantilever beam-type bending moment having the vehicle rear side as a fulcrum is generated.

On the turning outer wheel side, on the other hand, even if bending moment variation occurs at the point A in an opposite direction to the turning inner wheel side, this variation is absorbed as hysteresis loss of the front cross member 40, and therefore lateral displacement at the point B and deformation of the vehicle body 1 such as that on the turning inner wheel side are substantially non-existent.

In the first comparative example, the turning inner wheel side lower arm 130 is displaced to the vehicle width direction outer side, and since the tie rod 152 is disposed to the front side of the kingpin (the knuckle arm projects forward), a reduction (return) occurs in the actual steering angle of the turning inner wheel. As a result, the cornering force generated by the turning inner wheel side tire decreases, and the cornering force on the turning outer wheel side increases relative thereto.

Hence, the jack-down phenomenon of the turning inner wheel side suspension is suppressed while the jack-up phenomenon of the turning outer wheel side suspension is promoted, and as a result, the vehicle exhibits rolling behavior accompanying front rising pitching behavior.

Second Comparative Example

Figure 8B:
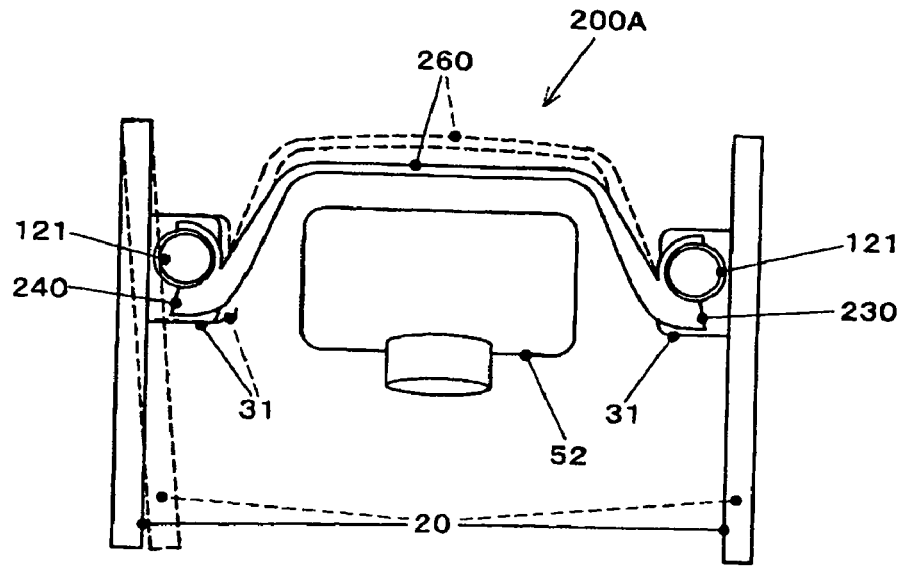
Figure 8A:
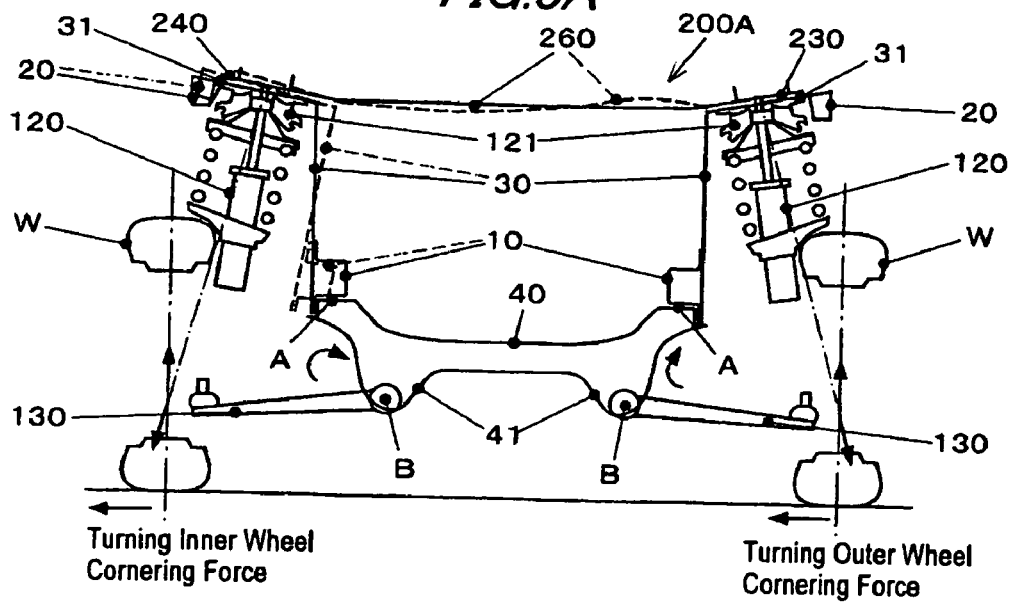
Figure 8C:

FIGS. 8A to 8C are pattern diagrams illustrating the constitution of a strut tower bar and a suspension device according to a second comparative example and vehicle body deformation during a turn, and a diagram showing a bending moment of the strut tower bar. In the bending moment diagram shown in FIG. 8C, the abscissa shows a position in the vehicle width direction, and the ordinate shows the magnitude and orientation of the bending moment (likewise in FIGS. 10C and 12C).

Figure 9:
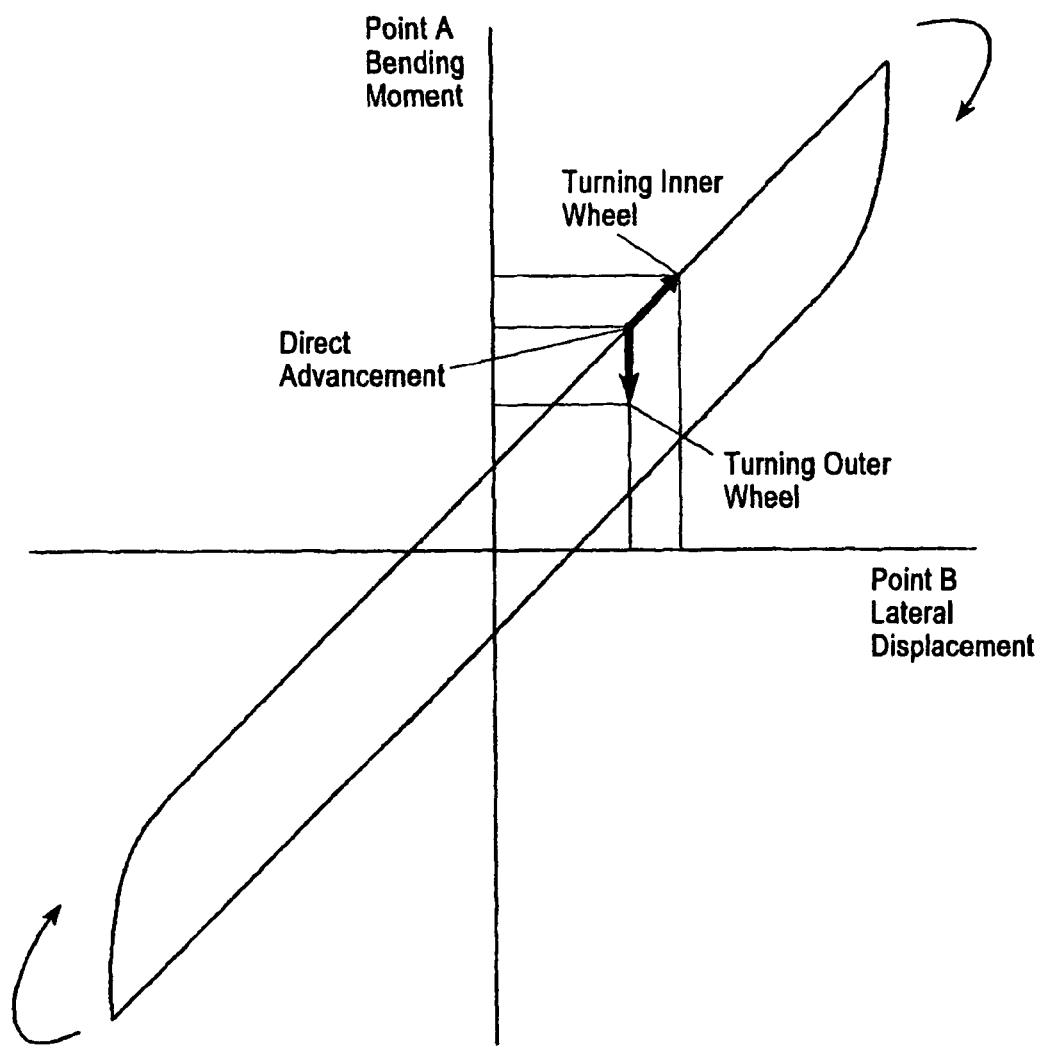
FIG. 9 is a graph showing a correlation between a bending moment of a front cross member support portion and lateral displacement of a bracket during a turn according to the second comparative example.

FIG. 9 is a graph showing a correlation between the bending moment of the front cross member support portion and lateral displacement of the bracket during a turn according to the second comparative example.

The second comparative example is provided with a strut tower bar 200A, to be described below, in place of the strut tower bar 200 according to the embodiment.

The strut tower bar 200A is a rigid strut tower bar having a shaft 260 that is formed integrally to the left and right instead of the left side shaft 210, right side shaft 220, and pillow ball joint 250 of the strut tower bar 200. The two end portions of the shaft 260 are fixed to the left and right brackets 231, 241, respectively.

As shown in FIG. 8B, when a compression load is applied to a strut tower bar not having a rotation allowing portion in accordance with displacement of the turning inner wheel side strut housing portion 30 during a turn, a bending mode having a node in a position that deviates toward the turning outer wheel side from the left-right center of the vehicle is exhibited. As a result, a bending moment such as that shown in FIG. 8C occurs in the strut tower bar 200A.

When this bending moment is input into the vehicle body 1 via the strut housing portion 30, the torsional moment that acts on the lower side frame 10 decreases on the turning inner wheel side and increases slightly on the turning outer wheel side.

As shown in FIG. 9, in the second comparative example, the bending moment at the point A decreases on the turning inner wheel side and increases on the turning outer wheel side in comparison with the first comparative example due to the action of the bending moment of the strut tower bar 200A described above. Therefore, lateral displacement at the point B decreases on the turning inner wheel side, leading to a reduction in the return of the actual steering angle of the turning inner wheel. Meanwhile, bending moment variation on the turning outer wheel side is absorbed as hysteresis loss of the front cross member 40, and therefore lateral displacement at the point B is substantially non-existent, similarly to the first comparative example.

Hence, in the second comparative example, the reduction in the cornering force of the turning inner wheel is alleviated to a certain extent in comparison with the first comparative example, and as a result, front rising pitching behavior during rolling is also alleviated.

Third Comparative Example

Figure 10B:
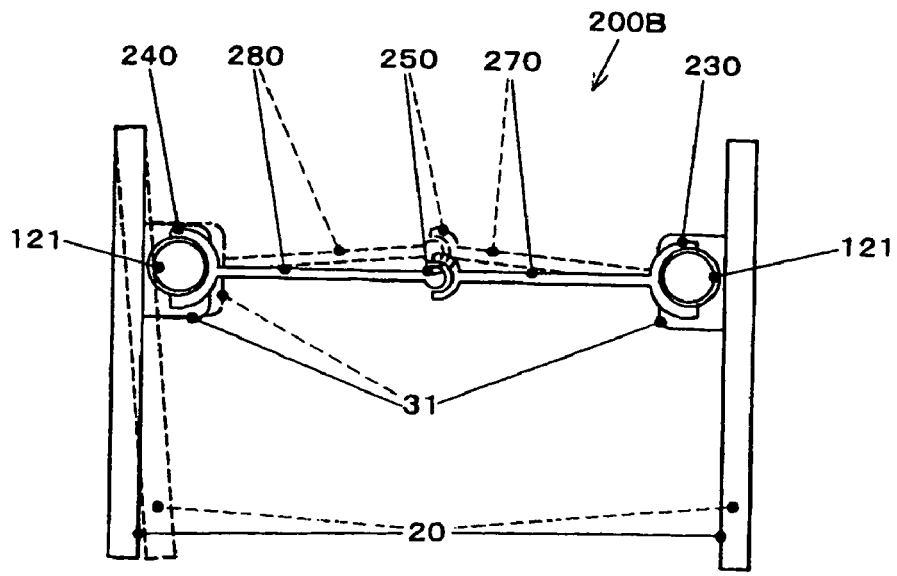
Figure 10A:
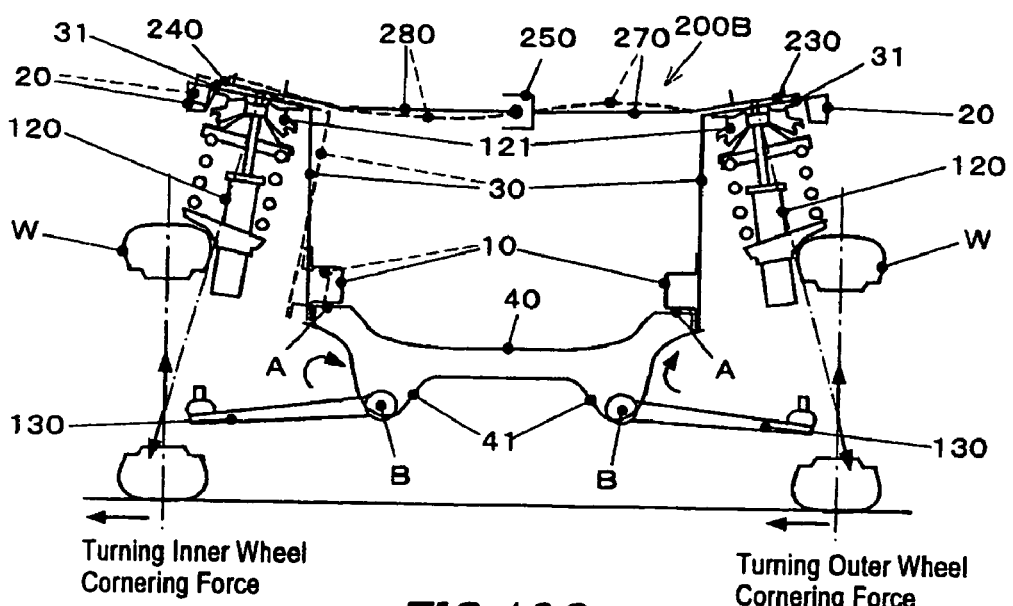
Figure 10C:

FIGS. 10A to 10C are pattern diagrams illustrating the constitution of a strut tower bar and a suspension device according to a third comparative example and vehicle body deformation during a turn, and a diagram showing a bending moment of the strut tower bar.

Figure 11:
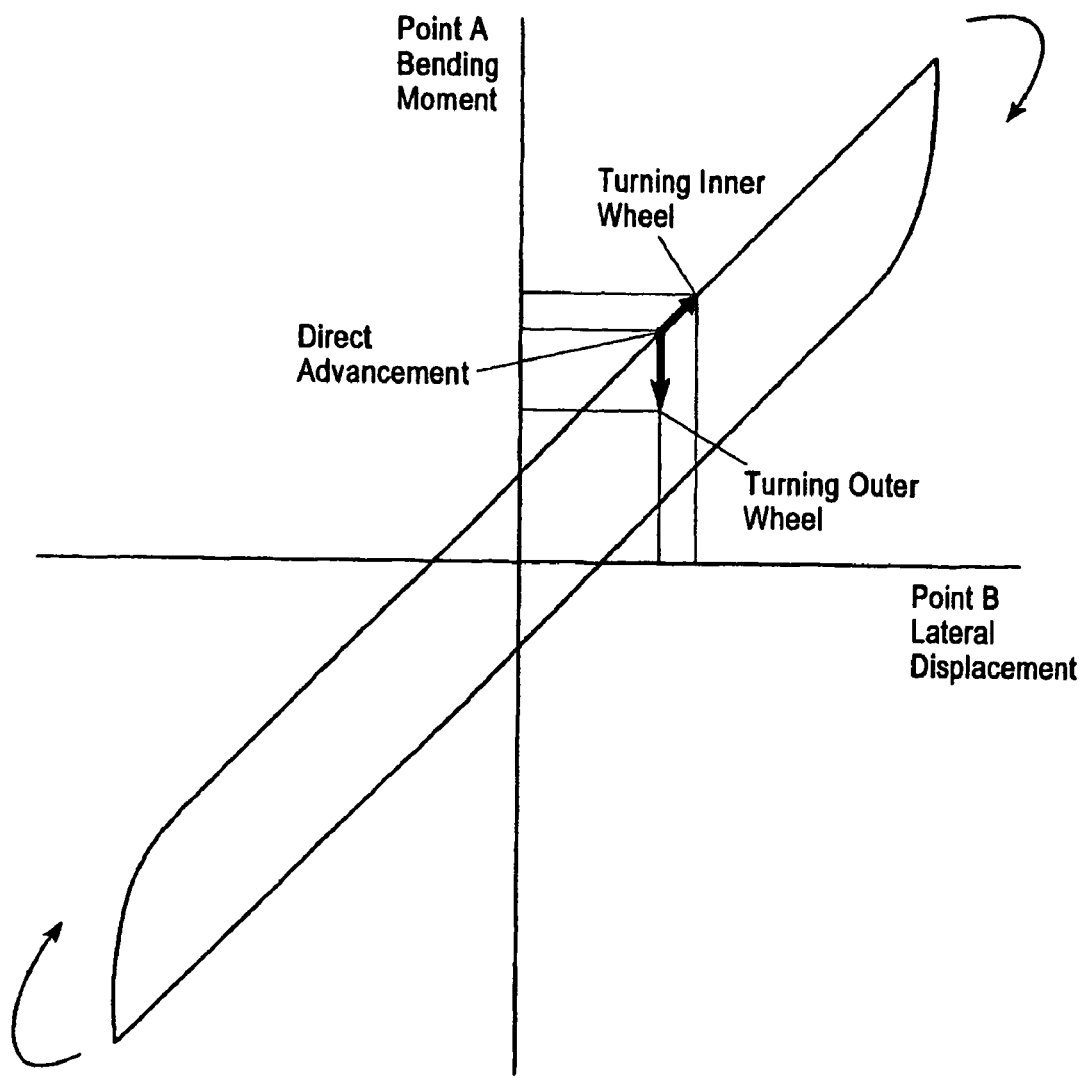
FIG. 11 is a graph showing a correlation between a bending moment of a front cross member support portion and lateral displacement of a bracket during a turn according to the third comparative example.

FIG. 11 is a graph showing a correlation between a bending moment of the front cross member support portion and lateral displacement of the bracket during a turn, according to the third comparative example.

The third comparative example is provided with a strut tower bar 200B, to be described below, in place of the strut tower bar 200 according to the embodiment.

The strut tower bar 200B is a flexible strut tower bar having a left side shaft 270 and a right side shaft 280, to be described below, instead of the left side shaft 210 and right side shaft 220 of the strut tower bar 200.

The left side shaft 270 and right side shaft 280 are disposed linearly substantially in alignment with the vehicle width direction over their entire length. Furthermore, the fixing location between the left side shaft 270 and the left side plate 230 and the fixing location between the right side shaft 280 and the right side plate 240 in the vehicle front-rear direction are respectively disposed in substantially identical positions to the shock absorber rod axis of the struts 120. The left side shaft 270 and right side shaft 280 are connected rotatably by the pillow ball joint 250 in a vehicle width direction central portion of the vehicle body 1.

As shown by the bending moment diagram in FIG. 10C, in the case of a flexible strut tower bar having the pillow ball joint 250 in an intermediate portion, the bending moment in the pillow ball joint 250 is zero, and bending moments having identical magnitudes and opposite orientations are generated in the left and right end portions. Therefore, in comparison with a case in which a rigid strut tower bar such as that of the second comparative example is attached, the torsional moment that acts on the lower side frame 10 decreases on the turning inner wheel side and increases on the turning outer wheel side.

As a result, the return of the actual steering angle of the turning inner wheel is reduced even further and front rising pitching behavior during rolling is suppressed, enabling an improvement in feeling.

However, in the third comparative example, the bending deformation of both the left and right shafts is small, and therefore the bending moment is also small. As a result, the steering stability improvement effect is insufficient. Furthermore, in the third comparative example, the strut tower bar 200B is disposed linearly substantially in alignment with the vehicle width direction, and it is therefore difficult to avoid interference with internal components of the engine room such as the intercooler 52.

Figure 12B:
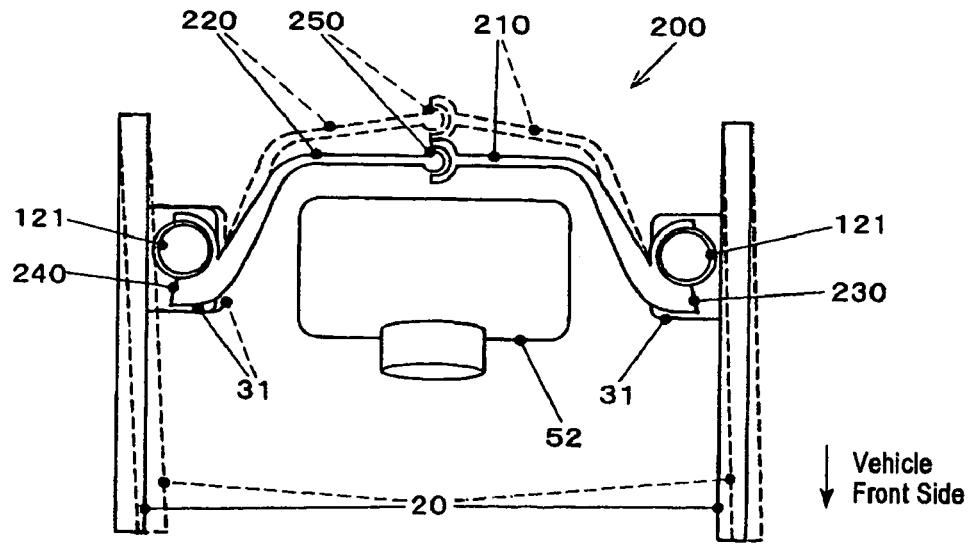
Figure 12A:
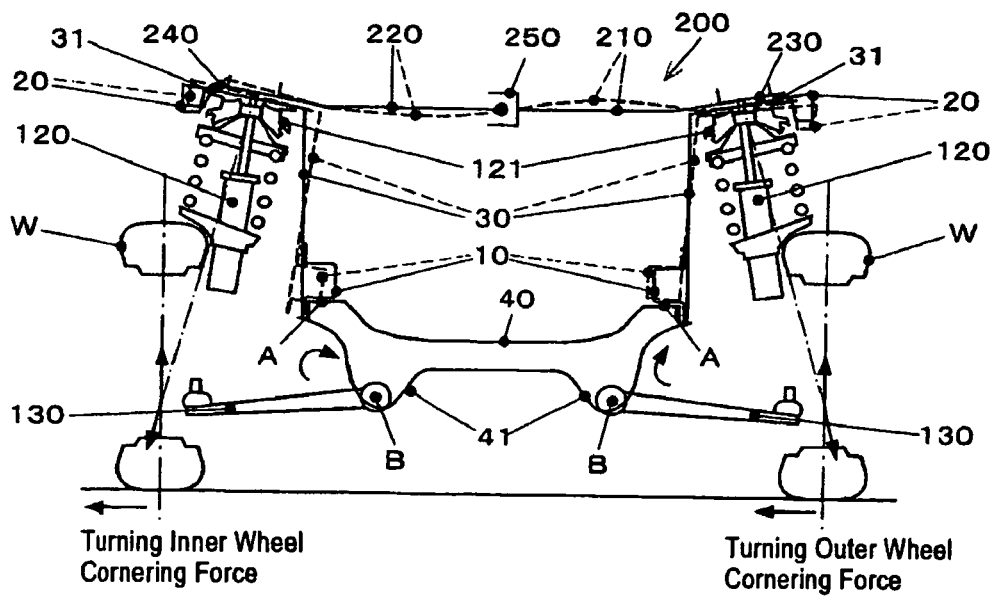
Figure 12C:
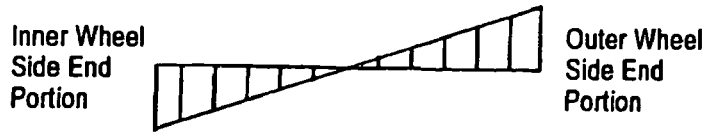

FIGS. 12A to 12C are pattern diagrams illustrating vehicle body deformation during a turn according to the embodiment, and a diagram showing the bending moment of the strut tower bar.

FIG. 13 is a graph showing a correlation between the bending moment of the front cross member support portion and lateral displacement of the bracket during a turn according to the embodiment.

In the embodiment, in contrast to the third comparative example, a part that is disposed at an incline relative to the vehicle width direction is provided in a part of the left side shaft 210 and right side shaft 220, and the pillow ball joint 250 is offset to the vehicle rear side in relation to the brackets 231, 241. Therefore, a distance (the span of each shaft) from the respective fixing portions with the brackets 231, 241 to the pillow ball joint 250 can be increased. In so doing, the bending deformation amount (bending flexure angle) of the left and right shafts is increased, enabling an increase in the bending moments of the left side shaft 210 and right side shaft 220 in the respective connecting portions with the brackets 231, 241, as shown in FIG. 12C. At this time, the strut tower bar 200 deforms such that the pillow ball joint 250 is displaced greatly rearward, as shown in FIG. 12B.

Hence, vehicle body displacement on the turning inner wheel side is suppressed even further, and moreover, vehicle body displacement in an opposite direction to the turning inner wheel side can be generated on the turning outer wheel side. In other words, even on the turning outer wheel side, the bracket 41 of the front cross member 40 and the lower arm 130 connected thereto displace slightly toward the vehicle width direction inner side in a region of large lateral force.

By disposing the vehicle body side fixing locations of the left side shaft 210 and right side shaft 220 further toward the front side than the position of the shock absorber rod axis of the strut 120, the effects of the strut tower bar 200 described above can be increased. More specifically, the upper side frame 20 exhibits a bending mode in the manner of a cantilever beam to which the toe board side (rear end portion side) is fixed, as shown in FIG. 12B, and therefore displacement of the front side increases. Hence, when the strut tower bar is attached further toward the front side, input into the strut tower bar increases, and as a result, a larger bending moment can be generated and a greater effect can be obtained during transmission of this bending moment to the vehicle body side.

Furthermore, by forming the left side shaft 210 and right side shaft 220 through bending and disposing the vehicle width center side part of each shaft and the pillow ball joint 250 on the rear side of the intercooler 52, interference with internal components of the engine room, such as the intercooler 52, can be prevented.

According to the embodiment described above, displacement of the lower arm 130 toward the vehicle width direction outer side is suppressed on the turning inner wheel side such that return of the actual steering angle is prevented. On the turning outer wheel side, on the other hand, the lower arm 130 is displaced toward the vehicle width direction inner side such that return of the actual steering angle is generated. Thus, the cornering force generated by the tire increases on the turning inner wheel side relative to the turning outer wheel side. As a result, the jack-down phenomenon of the turning inner wheel side suspension increases while the jack-up phenomenon of the turning outer wheel side suspension is suppressed, and therefore rolling behavior accompanying front falling pitching behavior can be obtained in the vehicle body 1 during a turn, enabling improvements in driver feeling and steering stability. Moreover, the cornering force of the turning inner wheel is improved, and therefore a yaw build-up characteristic in the initial steering stage is also improved.

Modified Examples

The present invention is not limited to the embodiment described above, and may be subjected to various alterations and modifications which are within the technical scope of the present invention.

(1) In the embodiment, a pillow ball is used in the rotation allowing portion, but the present invention is not limited thereto, and a different type of universal coupling may be used as long as it is capable of connecting the left and right shafts to each other rotatably.

(2) In the embodiment, the rotation allowing portion is offset to the vehicle body rear side of the vehicle body side fixing location, but may be offset to the vehicle body front side. For example, in the case of a rear wheel drive vehicle in which the front suspension is disposed frontward relative to the engine, the rotation allowing portion may be disposed on the front side of the engine.

(3) In the embodiment, the stiffening device is a strut tower bar provided between the left and right strut upper mounts of a strut-type suspension, for example, but the stiffening device is not limited thereto, and may be provided between vehicle body side attachment portions of left and right shock absorbers in a double wishbone-type or a multi-link-type suspension, for example.

(4) The materials and structure of the strut tower bar are not limited to those of the embodiment. For example, steel pipe, carbon fiber-reinforced resin pipe, or a combination thereof may be used as the material of the shafts. There are also no particular limitations on the shape and material of the vehicle body side fixing portion.

(5) In the embodiment, the rotation allowing portion is disposed on the rear side of the intercooler, but in the case of a vehicle installed with a natural intake engine, which does not include an intercooler, the rotation allowing portion may be disposed on the rear side or the like of an intake component such as a surge tank, an intake chamber, or a resonator, for example.

What is claimed is:

1. A stiffening device provided between left and right shock absorber support portions which are formed in a part of a vehicle body and on which shock absorber upper end portions of left and right suspension devices are respectively supported, comprising:

a left side shaft and a right side shaft fixed to the left and right shock absorber support portions, respectively; and a rotation allowing portion connecting the left side shaft and the right side shaft in a central portion of the vehicle body in a vehicle width direction, and allowing the left side shaft and the right side shaft to rotate around one of an axis running through a length of the left side shaft and an axis running through a length of the right side shaft, wherein a fixing location in which the left side shaft and the right side shaft are fixed to the shock absorber support portions is disposed further toward a vehicle front side than a position of a rod axis of a left shock absorber and a position of a rod axis of a right shock absorber in a vicinity of the left shock absorber support portion and the right shock absorber support portion respectively.

2. A stiffening device according to claim 1, wherein the rotation allowing portion is offset toward a vehicle rear side or the vehicle front side in relation to the fixing location in which the left side shaft and the right side shaft are fixed to the left shock absorber support portion and the right shock absorber support portion.

3. A stiffening device for a vehicle having left and right shock absorbers, comprising:

a first ring-shaped plate being fixed to a vehicle body in a proximity to an upper end portion of one of the left and right shock absorbers;

a second ring-shaped plate being fixed to the vehicle body in a proximity to an upper end portion of the other of the left and right shock absorbers;

a first shaft having an end connected to the first ring-shaped plate on a side of an axis connecting a center of the first ring-shaped plate and a center of the second ring-shaped plate; and a second shaft having an end connected to the second ring-shaped plate on a side of the axis, wherein another end of the first shaft and another end of the second shaft are configured to rotatably connect each other.

4. The stiffening device according to claim 3, wherein the first shaft is configured to extend across the axis to position the other end of the first shaft on the other side of the axis, and the second shaft is configured to extend across the axis to position the other end of the second shaft on the other side of the axis.

5. The stiffening device according to claim 1, further comprising a left side plate disposed on the left side shaft, opposite the rotation allowing portion, which connects the left side shaft to the fixing location of the left shock absorber support portion.

6. The stiffening device according to claim 1, further comprising a right side plate disposed on the right side shaft, opposite the rotation allowing portion, which connects the right side shaft to the fixing location of the right shock absorber support portion.

7. The stiffening device according to claim 1, wherein the rotation allowing portion comprises a pillow ball joint.

8. The stiffening device according to claim 1, wherein the left side shaft and the right side shaft comprise a hollow metal pipe.

9. The stiffening device according to claim 1, wherein the left side shaft connects to the rotation allowing portion and the left shock absorber support portion and the right side shaft connects to the rotation allowing portion and the right shock absorber support portion.

10. A stiffening device for a vehicle having left and right shock absorbers, comprising:

a left side shaft and a right side shaft being fixed to a vehicle body in the proximity to an upper end portion of one of the left and right shock absorbers, respectively; and a rotation allowing portion connecting the left side shaft and the right side shaft, and allowing the left side shaft and the right side shaft to rotate around one of an axis running through a length of the left side shaft and an axis running through a length of the right side shaft, wherein a fixing location in which the left side shaft and the right side shaft being fixed to the shock absorber support portions is disposed further toward a vehicle front side than a position of a rod axis of a left shock absorber and a position of a rod axis of a right shock absorber in the vicinity of the left shock absorber support portion and the right shock absorber support portion respectively.

11. A stiffening device according to claim 10, wherein the rotation allowing portion is offset toward a vehicle rear side or the vehicle front side in relation to the fixing location.

12. A stiffening device according to claim 1, wherein a portion of the left side shaft and a portion of the right side shaft is disposed at an incline such that the fixing location is positioned further toward a vehicle front side and lower toward an end of the left shock absorber and right shock absorber than the portion of the left side shaft and the portion of the right side shaft.

13. A stiffening device according to claim 5, wherein the left side plate is disposed substantially concentrically with a rod axis of the left shock absorber.

14. A stiffening device according to claim 6, wherein the right side plate is disposed substantially concentrically with a rod axis of the right shock absorber.

15. A stiffening device according to claim 5, wherein the left side plate is connected to the fixing location with a plurality of bolts.

16. A stiffening device according to claim 5, further comprising a bracket connecting the left side plate to the left side shaft.

17. A stiffening device according to claim 6, further comprising a bracket connecting the right side plate to the right side shaft.

18. A stiffening device according to claim 7, wherein the pillow ball joint comprises a grease-sealed type spherical bearing having a ball fixed to one of the left side shaft and the right side shaft and a race fixed to the other of the left side shaft and the right side shaft.

19. A stiffening device according to claim 1, wherein the rotation allowing portion is disposed further toward a vehicle rear side than the fixing locations.

20. A stiffening device according to claim 1, wherein the rotation allowing portion allows the left side shaft and the right side shaft to vibrate each other while axially constraining the left side shaft and the right side shaft.

* * * * *